(12) United States Patent
    Limberger et al.

(10) Patent No.: US 11,460,583 B2
(45) Date of Patent: Oct. 4, 2022

(54) METHOD AND APPARATUS FOR PROVIDING CORRECTION DATA FOR SATELLITE NAVIGATION

(71) Applicant: Robert Bosch GmbH, Stuttgart (DE)

(72) Inventors: Marco Limberger, Ludwigsburg (DE); Markus Langer, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 16/647,201

(22) PCT Filed: Sep. 19, 2018

(86) PCT No.: PCT/EP2018/075310
    § 371 (c)(1),
    (2) Date: Mar. 13, 2020

(87) PCT Pub. No.: WO2019/063379
    PCT Pub. Date: Apr. 4, 2019

(65) Prior Publication Data
    US 2021/0149060 A1    May 20, 2021

(30) Foreign Application Priority Data
    Sep. 26, 2017 (DE) .................. 10 2017 217 017.4

(51) Int. Cl.
    *G01S 19/07* (2010.01)
    *G01S 19/41* (2010.01)
(52) U.S. Cl.
    CPC ............ *G01S 19/072* (2019.08); *G01S 19/41* (2013.01)
(58) Field of Classification Search
    CPC .................................. G01S 19/72; G01S 19/41
    (Continued)

(56) References Cited

U.S. PATENT DOCUMENTS

| 6,674,398 B2 | 1/2004 | Murphy |
| 9,612,340 B1 | 4/2017 | Miller et al. |
| 2016/0036519 A1* | 2/2016 | Loomis ............... G01S 19/41 |
| | | 370/316 |

FOREIGN PATENT DOCUMENTS

| DE | 10 2006 016 281 A1 | 10/2007 |
| JP | 2007-170900 A | 7/2007 |

(Continued)

OTHER PUBLICATIONS

International Search Report corresponding to PCT Application No. PCT/EP2018/075310, dated Dec. 3, 2018 (German and English language document) (5 pages).

*Primary Examiner* — Bo Fan
(74) *Attorney, Agent, or Firm* — Maginot, Moore & Beck LLP (57) ABSTRACT

A method for providing correction data for satellite navigation, includes determining the correction data using a plurality of state signals relating to the Earth's ionosphere, each of the state signals associated with one of a plurality of signals which have been received by an interface for a plurality of mobile satellite receivers, the plurality of mobile satellite receivers provided for satellite navigation. Each of the plurality of state signals identify a geographical position of an associated one of the plurality of mobile satellite receivers and an item of state information relating to the Earth's ionosphere which is determined using at least one satellite signal transmitted between at least one satellite and the associated one of the plurality of mobile satellite receivers. The correction data is transmitted to the at least one satellite and then transmitted from the at least one satellite.

19 Claims, 3 Drawing Sheets

(58) Field of Classification Search
USPC .................. 342/357.24, 374, 357.03, 367
See application file for complete search history.

(56) References Cited

FOREIGN PATENT DOCUMENTS

JP      2008-122099  A    5/2008
JP      2011-196696  A    10/2011

* cited by examiner

METHOD AND APPARATUS FOR PROVIDING CORRECTION DATA FOR SATELLITE NAVIGATION

This application is a 35 U.S.C. § 371 National Stage Application of PCT/EP2018/075310, filed on Sep. 19, 2018, which claims the benefit of priority to Serial No. DE 10 2017 217 017.4, filed on Sep. 26, 2017 in Germany, the disclosures of which are incorporated herein by reference in their entirety.

BACKGROUND

The disclosure is based on an apparatus or a method for providing correction data for satellite navigation. The subject matter of the present disclosure is also a computer program.

To provide correction of positioning signals in satellite navigation, deviations in the Earth's ionosphere, for example, can be taken into account. This can be achieved, in particular, by accessing a network of geostationary, ground-side measuring stations.

SUMMARY

Against this background, in the approach presented here, a method in addition to an apparatus which uses said method, and finally, a corresponding computer program, are presented. The measures given enable advantageous extensions and improvements to the apparatus.

In accordance with embodiments, in particular, a multiplicity or a plurality of state information items relating to the Earth's ionosphere and corresponding geographical positions, which are provided, for example, by users of a navigation service and additionally or alternatively obtained from any other sources, can be processed in order to calculate correction data from them for global navigation satellite, and additionally or alternatively to improve existing correction data and, if applicable, correction models. Thus, for the correction of position signals transmitted by satellite for satellite navigation a state of the Earth's ionosphere can be incorporated more accurately and comprehensively by collecting measurements from a multiplicity of voluntary participants or by means of so-called Crowd-IT, so-called crowdsourcing, or so-called Crowd-Iono. The state information items from a multiplicity or plurality of satellite receivers used for satellite navigation allow, given a certain minimum number and density of participating satellite receivers, a reference station network for ionospheric state determination to be made more sparse, or a dense regional reference station network to be omitted altogether and only a less closely meshed global reference station network to be used.

Advantageously therefore, in accordance with embodiments, in particular, among other things, the accuracy of corrections of navigation signals with respect to deviations, disturbances and the like in the ionosphere of the earth can be increased. In addition, a fine-grained and geographically comprehensive determination of the state of the ionosphere is enabled. Thus, regions in which a state of the ionosphere may only be determined by interpolation can advantageously be reduced in size. A correction service provider can use the state information in order to improve estimates of a local ionosphere activity and thus to improve a position detection accuracy and convergence time (Time to First Fix, TTFF) for users. For example, a performance level of users of single-frequency satellite receivers can be strongly influenced by ionospheric phenomena, wherein in accordance with embodiments the state information, in particular, can enable exact corrections in order to obtain, for example, a so-called Precise Point Positioning or a precise positioning at the decimeter level. The so-called crowdsourcing of the state information may be advantageously carried out, in particular, by using dual-frequency satellite receivers or multi-frequency satellite receivers, a plurality of which, for example, can be installed in vehicles. The state information and the geographic position or position estimation of such a satellite receiver can be supplied, for example, by a vehicle via the cloud or data cloud with a data connection capability of appropriate data rate.

A method for providing correction data for satellite navigation is presented, wherein the method has at least the following step:

determining the correction data using a plurality of state signals relating to the Earth's ionosphere, wherein the state signals represent signals which have been read in from an interface to a plurality of mobile satellite receivers for satellite navigation, each state signal having a geographical position of one of the satellite receivers and an item of state information relating to the Earth's ionosphere, which is determined using at least one satellite signal transmitted between at least one satellite and the satellite receiver.

This method can be implemented, for example, in software or hardware or in a combination of software and hardware, for example, in a control unit or an apparatus. The correction data may be suitable for effecting a correction of satellite signals in relation to deviations, disturbances and additionally or alternatively, a current state of the ionosphere. A satellite receiver can be designed to allow a position determination by satellite navigation for a user, and additionally or alternatively for a user's equipment, using at least one satellite signal. The at least one satellite signal can also comprise previously determined correction data. The previously determined correction data may have been provided in a previous implementation or iteration of the method. The satellite receiver unit can be implemented as a dual-frequency satellite receiver or multi-frequency satellite receiver. The state information can represent a characteristic parameter of the Earth's ionosphere, in particular in a local region of the ionosphere between the geographical position of a relevant satellite receiver and a relevant satellite.

In accordance with one embodiment, in the determination step the correction data can be determined using a multiplicity of reference state signals. In this case, the reference state signals can represent signals read in from stationary reference satellite receivers. Additionally or alternatively, in the determination step the correction data can be determined using an ionosphere correction model. Additionally or alternatively, in the determination step the correction data can be determined using a modeling algorithm. The multiplicity of reference satellite receivers can be arranged in a regional, national and additionally or alternatively, in a global grid or network. Such an embodiment offers the advantage that an accuracy of corrections with regard to ionosphere effects can be further increased and thus a satellite navigation can be further improved.

The method can also comprise a step of reading in the state signals from the interface to the plurality of mobile satellite receivers for satellite navigation. Such an embodiment offers the advantage that a plurality of state signals can be processed by mobile satellite receivers, which can be used for satellite navigation and as observation stations.

In the reading-in step, at least a subset of the state signals can be read in from an interface to a plurality of vehicle-mounted satellite receivers. A vehicle-mounted satellite receiver can be mounted, installed or fixed in a vehicle, or can be arranged in a vehicle in a removable manner. Such an embodiment offers the advantage that satellite receivers already installed in the majority of vehicles can be used for data collection. Therefore, the state of the ionosphere can be determined for the correction accurately, simply and in a fine-grained way.

Furthermore, the method can comprise a step of outputting the correction data to the at least one satellite. In this case the correction data can be used for correcting a transmission of the at least one satellite signal between the at least one satellite and the multiplicity of mobile satellite receivers. In addition, in the outputting step the correction data can be output to the multiplicity of satellite receivers. Such an embodiment offers the advantage that it enables a reliable and accurate correction for satellite navigation.

According to one embodiment, the state information items can represent a total electron content as a characteristic parameter of the Earth's ionosphere. The total electron content can be defined here as a product of the electron density and distance, measured in electrons per square meter. Such an embodiment offers the advantage that, on the basis of this type of state information, reliable information can be obtained about the condition of the ionosphere in a local area between a respective satellite receiver and a respective satellite.

The method can also comprise a step of determining the state information by using a signal change in the at least one satellite signal. In this case, the signal change can represent a result of a comparison of at least one signal property in relation to at least two transmission frequencies of the at least one satellite signal. The at least one signal property can represent a pseudo-distance, a carrier phase and additionally or alternatively, at least one other signal property. Such an embodiment offers the advantage that the state information can be determined reliably and accurately.

The approach presented here also creates an apparatus that is designed to carry out, to control and/or implement the steps of an alternative design of a method presented here in corresponding devices. Also, by means of this design variant of the disclosure in the form of an apparatus, the underlying object of the disclosure can be achieved quickly and efficiently.

For this purpose, the apparatus can comprise at least one processing unit for processing signals or data, at least one storage unit for storing signals or data, at least one interface to a sensor or an actuator for reading in sensor signals from the sensor or for outputting data or control signals to the actuator, and/or at least one communication interface for reading in or outputting data that are embedded in a communication protocol. The processing unit can be, for example, a signal processor, a micro-controller or the like, wherein the storage unit can be a flash memory, an EEPROM or a magnetic storage unit. The communication interface can be designed to read in or output data by wireless and/or cable-based means, wherein a communication interface which can read in or output cable-based data can read in this data, for example, by electrical or optical means from an appropriate data transmission line or can output this data into an appropriate data transmission line.

An apparatus in the present case can be understood to mean an electrical device, which processes sensor signals and outputs control and/or data signals depending on them. The apparatus can have an interface, which can be implemented in hardware and/or software. In the case of a hardware-based design, the interfaces can be, for example, part of a so-called system-ASIC, which includes the wide range of functions of the apparatus. It is also possible, however, that the interfaces are dedicated integrated circuits, or at least in part consist of discrete components. In the case of a software-based design, the interfaces can be software modules which exist, for example, on a micro-controller in addition to other software modules.

In an advantageous design, the apparatus can be implemented as a correction service or a correction service system. In this case the apparatus controls a signal transmission between at least one satellite and a plurality of satellite receivers for satellite-based navigation. For this purpose, the apparatus can access, for example, sensor signals or input signals, such as state signals and reference state signals. The control is performed via signal transmission devices such as transmission devices, transceivers and antennas.

Also advantageous is a computer program product or computer program with program code, which can be stored on a machine-readable medium or storage medium, such as a semiconductor memory, a hard drive or an optical storage device and is used to carry out, implement and/or control the steps of the method according to any one of the embodiments described above, in particular when the program product or program is executed on a computer or a device.

BRIEF DESCRIPTION OF THE DRAWINGS

Exemplary embodiments of the approach presented here are shown in the drawings and explained in more detail in the following description. Shown are.

DETAILED DESCRIPTION

In the following description of advantageous exemplary embodiments of the present disclosure, identical or similar reference numerals are used for elements shown in the various figures which have similar functions, wherein no repeated description of these elements is given.

Figure 1:
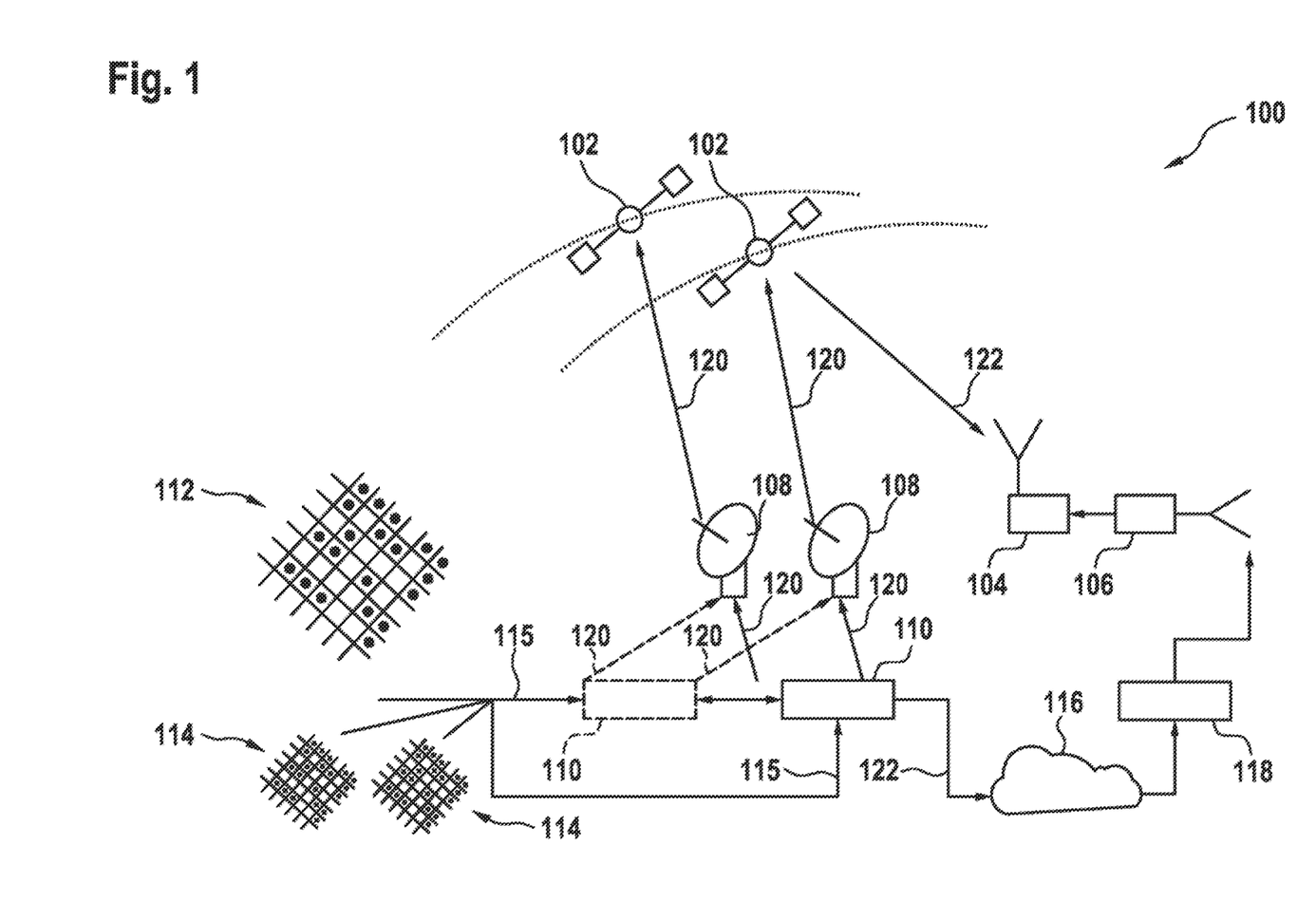
FIG. 1 a schematic illustration of a satellite navigation system.

FIG. 1 shows a schematic illustration of a satellite navigation system 100. The satellite navigation system 100 is implemented, for example, as a so-called global civil satellite navigation system (GNSS=Global Navigation Satellite System). In this case the satellite navigation system 100 has a correction service.

The satellite navigation system satellite 100 has satellites 102, which are arranged in particular in a geostationary orbit of the earth. In particular, the satellite navigation system 100 has a plurality of satellites 102 and/or redundant satellites 102. Of these, the first satellite 102 can be positioned, for example, over North America, while a second of the satellites 102 can be positioned, for example, over Europe.

In addition, the satellite navigation system 100 has a plurality of satellite receivers 104, wherein for reasons of space only one satellite receiver unit 104 is shown in the drawing of FIG. 1 as an example. The satellite receiver 104 can also be referred to as a GNSS receiver 104. The satellite receiver 104 is connected to communication modules 106 over a signal transmission channel.

The satellite navigation system 100 also has a plurality of transmitting stations 108 for transmitting signals to the satellites 102. The transmitting stations 108 can also be referred to as uplink path stations 108, uplink stations 108, or stations for an uplink. The transmitting stations 108 are connected to at least one data center 110 or server 110 over a signal transmission channel. FIG. 1 shows an example containing only two data centers 110. The data centers 110 are connected to each other over a signal transmission channel, in particular to be able to perform a consistency check.

In addition, the satellite navigation system 100 has a plurality of global reference stations 112 and optionally a plurality of additional local reference stations 114. The reference stations 112, 114 are designed to obtain correction values 115. The reference stations 112, 114 are connected to the at least one data center 110 over a signal transmission channel.

The at least one data center 110 is connected via a backend server 116 and a mobile data connection 118 or mobile internet connection 118 to the communication modules 106 and therefore to the satellite receivers 104 via a signal transmission channel.

From the at least one data center 110, correction data 120 are transmitted via the transmitting stations 108 to the satellites 102. In addition, integrity information items 122 are transmitted from the at least one data center 110 via the backend server 116 and the mobile data connection 118 to the communication modules 106 and therefore the satellite receivers 104, as well as from the satellites 102 to the satellite receivers 104.

Figure 2:
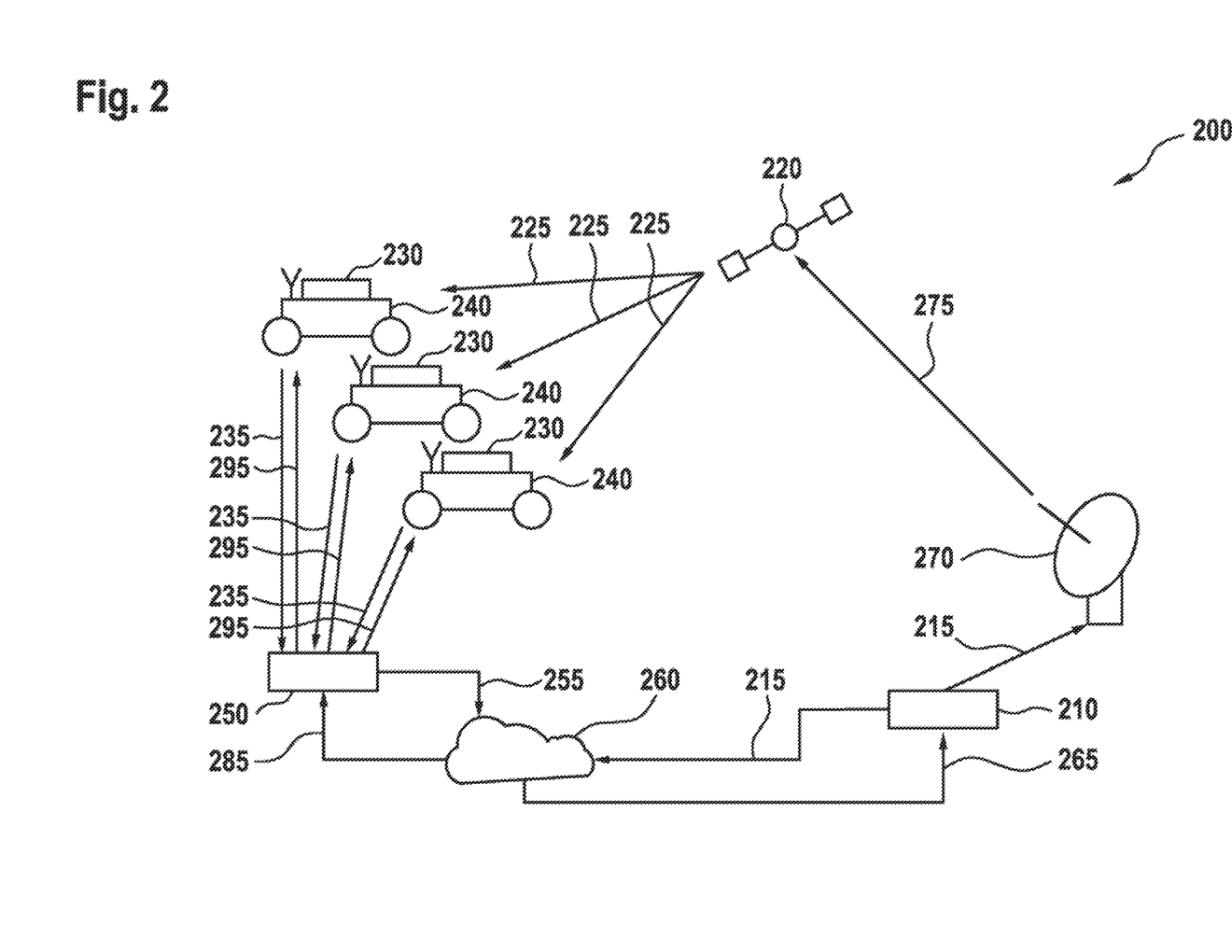
FIG. 2 a schematic illustration of a satellite navigation system having an apparatus for provision in accordance with one exemplary embodiment.

FIG. 2 shows a schematic illustration of a satellite navigation system 200 having an apparatus 210 for provision in accordance with one exemplary embodiment. The satellite navigation system 200 is implemented, for example, as a so-called global civil satellite navigation system (GNSS=Global Navigation Satellite System). The apparatus 210 is designed to provide correction data 215 to provide correction for a satellite navigation. In other words, the apparatus 210 is designed to allow and/or to perform a GNSS correction.

In addition, the example satellite navigation system 200 according to the exemplary embodiment shown in FIG. 2 has only one satellite 220, in particular a geostationary satellite 220, with only three satellite receivers 230 for satellite navigation by way of example, which are installed in, for example, only three vehicles 240, an interface 250, for example in the form of a mobile data interface, a so-called at backend server 260 and by way of example, only one ground station 270 or data transmission device 270.

The apparatus 210 is connected to the satellite 220 via the ground station 270 over a data transmission channel.

In addition, the apparatus 210 is connected via the backend server 260 and the interface 250 to the satellite receivers 230 over a data transmission channel. The satellite receivers 230 are connected to the satellite 220 over a data transmission channel.

The satellite 220 is designed to emit satellite signals 225. The satellite receivers 230 are designed to receive the satellite signals 225. Each of the satellite signals 225 can exhibit an individual signal modification due to a locally different state of the Earth's ionosphere.

Each of the satellite receivers 230 is designed to emit a state signal 235, which comprises the state information and a geographical position of the satellite receiver 230, to the interface 250. The state information represents information relating to a state of the ionosphere in a region between the respective satellite receiver 230 and the satellite 220. The satellite receivers 230 in accordance with one embodiment are designed to use a signal change in the satellite signals 225 to determine a state information of the ionosphere or a local state of the ionosphere in an area between the respective satellite receiver 230 and the satellite 220. The satellite receivers 230 are designed, for example, to determine the signal change by comparing at least one signal characteristic of a satellite signal 225 in relation to at least two transmission frequencies of the satellite signal 225.

The interface 250 is designed to enable and/or carry out a transmission of the state signals 235 as transmitted state signals 255 to the backend server 260. The backend server 260 is designed to forward, collect and/or process the transmitted state signals 255. In addition, the backend server 260 is designed to forward the transmitted state signals 255 to the apparatus 210 in the form of forwarded state signals 265.

The apparatus 210 is designed to read in a multiplicity of the state signals 235 in the form of the forwarded state signals 265 from the interface 250. The apparatus 210 is also designed to determine correction data 215 using a multiplicity of state signals 235 and/or transmitted state signals 255 and/or forwarded state signals 265. More specifically, the apparatus 210 is designed to determine the correction data 215 by using the forwarded state signals 265, wherein the forwarded state signals 265 represent a forwarded version of the transmitted state signals 255 and the transmitted state signals 255 represent a transmitted version of the state signals 235.

In addition, the apparatus 210 is designed to output the correction data 215 to the satellite 220 via the ground station 270. In this case, the ground station 270 is designed to transmit the correction data 215 to the satellite 220 as transmitted correction data 275. The satellite 220 is designed to emit the satellite signals 225 using the correction data 215 or the transmitted correction data 275. The apparatus 210 is also designed to output the correction data 215 to the backend server 260. The backend server 260 is designed to forward, collect and/or process the correction data 215. Also, the backend server 260 is designed to forward the correction data 215 to the interface 250 as forwarded correction data 285. The interface 250 is designed to enable and/or carry out a transmission of the forwarded correction data 285 to the satellite receivers 230 as transmitted correction data 295.

Users of the navigation satellite system 200 supply GNSS observation parameters in the form of the state signals 235, in order to enable precise ionosphere corrections to be generated, which can then be provided to the user.

Figure 3:
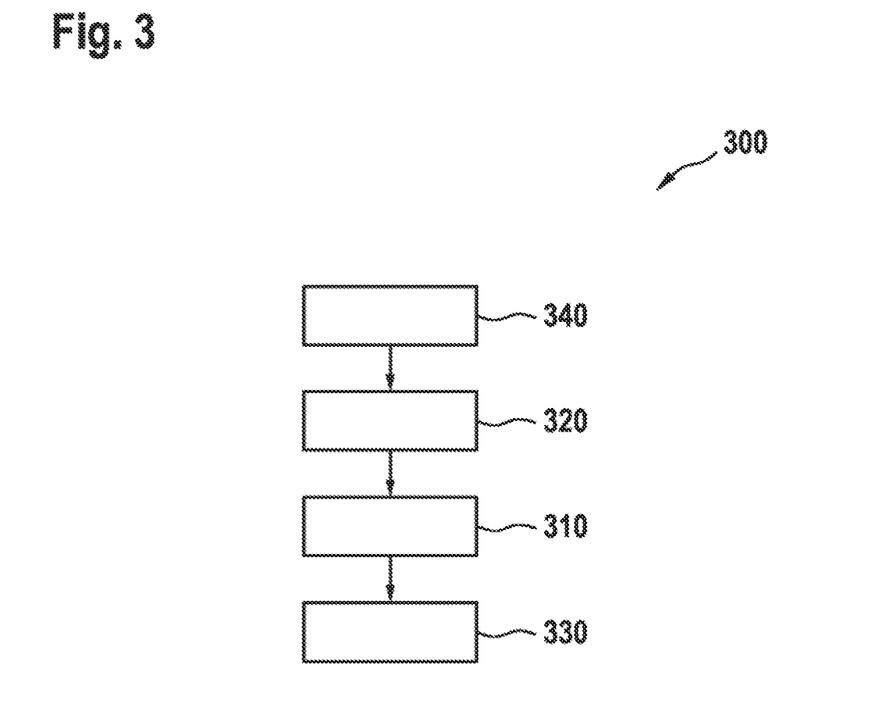
FIG. 3 a flow chart of a method for provision in accordance with an exemplary embodiment.

FIG. 3 shows a flow diagram of a method 300 for provision in accordance with an exemplary embodiment. The method 300 can be executed in order to provide correction data for the satellite navigation. As such the method 300 for provision can be executed in conjunction with or using the apparatus of FIG. 2 or a similar apparatus, and at least one satellite receiver of FIG. 2 or a similar satellite receiver.

In a determination step 310 in the method 300 the correction data are determined using a multiplicity of state signals relating to the Earth's ionosphere. The state signals in this case represent signals that are read in from an interface to a plurality of mobile satellite receivers for satellite navigation. Each state signal has a geographical position of one of the satellite receivers and an item of state information relating to the Earth's ionosphere, which is determined using at least one satellite signal transmitted between at least one satellite and the satellite receiver.

In accordance with an exemplary embodiment the method 300 for provision comprises a step 320 of reading in the state signals from the interface to the multiplicity of mobile satellite receivers for satellite navigation. In particular, in the reading-in step 320, at least a subset of the state signals is read in from an interface to a multiplicity of vehicle-mounted satellite receivers.

According to a further exemplary embodiment, the method 300 for provision has a step 330 of outputting the correction data to the at least one satellite. In this case the correction data can be used for correcting a transmission of the at least one satellite signal between the at least one satellite and the multiplicity of mobile satellite receivers.

In particular, the state information represents a total electron content as a characteristic parameter of the earth's ionosphere. The total electron content is defined as a product of the electron density and distance, measured in electrons per square meter. In accordance with one exemplary embodiment, in the determination step 310 the correction data are determined using a multiplicity of reference state signals. The reference state signals represent signals read in from stationary reference satellite receivers. Additionally or alternatively, in the determination step 310 the correction data are determined using an ionosphere correction model. Additionally or alternatively, in the determination step 310 the correction data are determined using a modeling algorithm.

According to a further exemplary embodiment, the method 300 for provision also has a step 340 of determining the state information using a signal change of the at least one satellite signal. The signal change represents or is derived as a result of a comparison of at least one signal property in relation to at least two transmission frequencies of the at least one satellite signal. The determination step 340 can be implemented, for example, using the apparatus of FIG. 2 or a similar apparatus and/or using at least one of the satellite receivers of FIG. 2, or at least a similar satellite receiver.

With reference to the figures described above, in the following, exemplary embodiments and advantages of exemplary embodiments will be briefly summarized and/or presented again in other words.

In accordance with exemplary embodiments, for example, a comparison is performed between ionosphere correction data and ionosphere errors determined from GNSS receiver observation values. Also, in accordance with exemplary embodiments, in particular, a state of the ionosphere is determined by crowdsourcing using TEC values (TEC=Total electron content; characteristic parameter of the Earth's ionosphere; product of electron density and distance, measured in electrons per square meter; affected by solar activity).

In particular, GNSS correction service providers offer their services for a plurality of applications which use, for example, both inexpensive single-frequency and dual-frequency GNSS receivers (or those for more frequencies) as satellite receivers 230. The same provide GNSS correction data 235, 255, 265, which can be used to achieve more accurate positioning solutions, for example, more accurate than the decimeter level. The correction data 235, 255, 265 allow the satellite receivers 230 to mitigate or largely eliminate systemic sources of error, such as satellite orbit and clock errors and satellite deviations as well as ionosphere effects. Particularly for a single-frequency unit or single-frequency receiver, the elimination or alleviation of the influence of the ionosphere is significant, for example, with regard to the attainment of a high positioning accuracy.

The state of the ionosphere can be assessed, in particular, by the Total Electron Content (TEC). This parameter is determined by service providers by collecting measurement data from a plurality of reference stations 112 and 114. Service providers typically use a global or regional network of reference stations 112 and 114 with a baseline length between reference stations of, for example, over 1000 kilometers (global Precise Point Positioning, PPP), down to 70 kilometers (small-scale Real Time Kinematics, RTK). A provision of services for users within the limits of their network (globally or locally) and the use of a space-based representation model (SSR model) require, for example, that ionosphere correction parameters can be estimated as accurately as possible. Typically, the ionosphere correction parameters can be provided as a thin-layer spherical model with a so-called VTEC value (VTEC=vertical TEC) arranged in a grid. When the ionosphere is subject to any kinds of disturbance, such as solar storms or moving ionospheric disturbances (TID, traveling ionospheric disturbances), then the service providers cannot estimate a true state of the ionosphere between such grid points, or an existing ionospheric disturbance may be smoothed out due to an inappropriate interpolation between grid points. In accordance with embodiments, however, users of the service can nevertheless be enabled to detect the ionospheric disturbance and experience an improvement in, or at least maintain, their positioning accuracy and/or position detection accuracy and/or position detection capability. The resulting effect can be more noticeable, for example, for single-frequency consumer equipment than for dual-frequency equipment.

TEC measurements for the state information can be obtained by means of the satellite receivers 230 and/or the apparatus 210 by, for example, forming a difference between observation values of a pseudo-distance measurement or code measurement and a carrier-phase measurement between two frequencies of the satellite signal 225 emitted by the same satellite 220. TEC measurements on the basis of the carrier phase are accurate, but ambiguous. Code-based measurements provide absolute, but noisy TEC measurements together with a carrier-TEC smoothing of the code-TEC measurements. Dual-frequency receivers as satellite receivers 230 can determine a TEC value for line-of-sight measurements to each satellite 220, which the same are tracking, typically known as slanted TEC or STEC (slant TEC). The necessary measurements are typically pseudo-distance measurement or code measurement on L1 and L2, known as P1 and P2, and carrier-phase measurement for L1 and L2, known as Phi1 and Phi2. Other frequencies or a combination of frequencies can also be used. In current applications the position of the tracking GNSS receiver or satellite receiver unit 230 is known precisely, i.e. typically to less than one centimeter. For each satellite 220 or GNSS satellite being tracked by a satellite receiver unit 230, measurements can be processed in order to determine the TEC together with a beam propagation path from the satellite 220 to the satellite receiver 230.

In a network application, according to an exemplary embodiment measurement data from many reference receivers 112 and 114 can be used in order to estimate, for example, VTEC values together with other parameters such as orbit, clock and satellite deviations. In contrast to the determination of the TEC solely by means of such a network, in accordance with exemplary embodiments it is possible to ensure that access is no longer restricted only to such networks which, dependent on the required accuracy and application, typically have baseline lengths of more than 70 kilometers, 200 kilometers or even 1000 km. This means that a user of these TEC values, or an of the application to use these TPC values, needs to interpolate less extensively between the correction data received from the network operator. An existing network can be made more sparse or more dense by the mobile satellite receivers 230, i.e. more reference stations 112 and 114 and mobile satellite receivers 230 can be provided in order to be able to determine or estimate the state of the ionosphere more accurately. Rapid changes in the ionosphere due to events such as solar storms can thereby be detected more accurately, because data from multiple reference stations 112 and 114 as well as mobile satellite receivers 230 can reveal the impact of such a phenomenon. In addition, a disappearance of a disturbance occurring in the signal evaluation as a result of smoothing effects of an interpolation procedure can be mitigated or eliminated.

Satellite receivers 230 can support more than two frequencies, which allows an assessment of higher-order ionosphere phenomena.

Improvements in the GNSS receiver technology in terms of cost and performance enable less expensive satellite receivers 230 for two or more frequencies to be installed in vehicles 240. These GNSS receivers or satellite receivers 230 can allow a positioning and navigation with an accuracy below the decimeter level by using external correction service providers. In order for a GNSS receiver or satellite receiver unit 230 to be able to achieve this degree of precision, the satellite receiver 230 is designed to perform very precise pseudo-distance or code and carrier-phase measurements on both frequencies for each satellite 220 that the receiver is tracking. On the basis of the capability for very precise pseudo-distance or code and carrier-phase measurements on two or more frequencies, a user-side mobile satellite receiver 230 is able to calculate STEC values. Each vehicle 240 with a mobile satellite receiver 230 thus supplies, so to speak, calculated TEC values for each satellite 220 being tracked as state information together with its own position estimation at its own positioning rate (typically up to 10 Hertz) to the apparatus 210, implemented, for example, as a central processing device (Central Processing Facility, CPF), which is operated by the service provider, and the CPF uses the STEC values for an ionospheric correction model. The vehicles are typically connected to the data cloud or cloud via any type of data connection. The TEC data are transmitted to the service provider, for example, from each of the vehicles 240 at the data rate matching the bandwidth and performance capability of the data connection. The service providers use the calculated TEC values to optimize their estimates of the behavior of the ionosphere, for example between grid points of a thin-layer spherical model.

The correction data 215, 275, 285, 295 can also be obtained by a GNSS receiver or satellite receiver unit 230 that is capable of capturing signals on three or more frequencies, with open signals for measurements with lower noise, which can allow the elimination of higher-order ionospheric phenomena. In order to obtain a more complete picture of the ionosphere, the correction data 215, 275, 285, 295 can also be fed into highly developed modeling algorithms, such as multi-layer models. The correction data 215, 275, 285, 295 can be used by a service provider to transmit more precise estimates of ionosphere corrections to its users of navigation and position determination, or the same data can be used to support a space weather determination for different applications, such as radio astronomy, air traffic communications, electricity grids, etc., or the data can contribute to better scientific models of the ionosphere.

If an exemplary embodiment comprises an "and/or" association between a first and a second feature, this should be read as meaning that the exemplary embodiment according to one embodiment has both the first feature and the second feature, and in accordance with another exemplary embodiment it has either only the first or only the second feature.

The invention claimed is:

1. A method for providing correction data for satellite navigation, the method comprising:
    receiving at least one first satellite signal from at least one satellite with an associated plurality of mobile satellite receivers;
    receiving a plurality of state signals from the associated plurality of mobile satellite receivers with an interface configured to communicate with the plurality of mobile satellite receivers, each of the plurality of state signals corresponding to one of the associated plurality of mobile satellite receivers, each of the plurality of state signals identifying a geographical position of the corresponding mobile satellite receiver and an item of state information relating to the Earth's ionosphere which is determined using the at least one first satellite signal;
    receiving, with a processor, the plurality of state signals from the interface;
    determining, with the processor, the correction data using the plurality of state signals; and
    transmitting, with the processor, the correction data to the at least one satellite.

2. The method as claimed in claim 1, wherein determining the correction data further comprises:
    determining the correction data using at least one of an ionosphere correction model and a modeling algorithm, based on the plurality of state signals and a plurality of reference state signals,
    wherein the plurality of reference state signals are associated with signals received from at least one stationary reference satellite receiver.

3. The method as claimed in claim 1, wherein the associated plurality of mobile satellite receivers includes a plurality of vehicle-mounted satellite receivers.

4. The method as claimed in claim 1, comprising:
    using the correction data to correct a transmission of at least one second satellite signal between the at least one satellite and at least one of the associated plurality of mobile satellite receivers.

5. The method as claimed in claim 1, wherein:
    the item of state information of each of the plurality of state signals is associated with a total electron content as a characteristic parameter of the Earth's ionosphere; and
    the total electron content is defined as a product of the electron density and distance, measured in electrons per square meter.

6. The method as claimed in claim 1, further comprising determining the item of state information of each of the plurality of state signals based on a respective comparison of at least one signal property in relation to at least two transmission frequencies of the at least one satellite signal.

7. The method as claimed in claim 1, wherein the processor is a backend server configured to communicate with the interface.

8. The method as claimed in claim 1, wherein the transmitting the correction data further comprises:

transmitting the correction data to the at least one satellite by way of a ground station configured to communicate with the at least one satellite.

9. The method as claimed in claim 1, further comprising: transmitting the correction data to the associated plurality of mobile satellite receivers via the interface.

10. A system for providing correction data for satellite navigation, comprising:
at least one satellite;
a plurality of mobile satellite receivers configured for satellite navigation using at least one first signal from the at least one satellite, the at least one first signal including the correction data;
an interface configured to communicate with the plurality of mobile satellite receivers;
a machine readable storage unit including program instructions stored therein; and
a microprocessor operably connected to the machine readable storage unit and configured to execute the program instructions to
determine the correction data using a plurality of state signals relating to the Earth's ionosphere, each of the state signals associated with one of a plurality of second signals which have been received by the interface, each of the plurality of state signals identifying a geographical position of an associated one of the plurality of mobile satellite receivers and an item of state information relating to the Earth's ionosphere which is determined using a plurality of third signals transmitted from the at least one satellite to an associated one of the plurality of mobile satellite receivers, and
transmit the correction data to the at least one satellite.

11. The system as claimed in claim 10, wherein the microprocessor is further configured to execute the program instructions to:
determine the correction data using a plurality of reference state signals by using at least one of an ionosphere correction model and a modeling algorithm, wherein the plurality of reference state signals are associated with signals received from stationary reference satellite receivers.

12. The system as claimed in claim 11, wherein the microprocessor is further configured to execute the program instructions to:
determine the correction data using a plurality of reference state signals by using the ionosphere correction model and the modeling algorithm.

13. The system as claimed in claim 10, wherein:
the plurality of mobile satellite receivers are configured to receive the plurality of state signals from the interface.

14. The system as claimed in claim 13, wherein the plurality of mobile satellite receivers are a plurality of vehicle-mounted satellite receivers.

15. The system of claim 10, wherein:
the state information is associated with a total electron content as a characteristic parameter of the Earth's ionosphere; and
the total electron content is defined as a product of the electron density and distance, measured in electrons per square meter.

16. The system as claimed in claim 10, wherein the microprocessor is further configured to execute the program instructions to
determine the state information using a signal change of a first of the plurality of third satellite signal, wherein the signal change represents a result of a comparison of at least one signal property in relation to at least two transmission frequencies of the first of the plurality of third satellite signal.

17. The method as claimed in claim 2, wherein determining the correction data further comprises:
determining the correction data using both the ionosphere correction model and the modeling algorithm.

18. The system as claimed in claim 10, wherein the microprocessor is further configured to execute the program instructions to:
transmit the correction data to the at least one satellite by way of a ground station configured to communicate with the at least one satellite.

19. The system as claimed in claim 10, wherein the microprocessor is further configured to execute the program instructions to:
transmit the correction data to the plurality of mobile satellite receivers via the interface.

* * * * *